US011860992B1

(12) United States Patent
Ziegler et al.

(10) Patent No.: US 11,860,992 B1
(45) Date of Patent: Jan. 2, 2024

(54) AUTHENTICATION AND AUTHORIZATION FOR ACCESS TO SOFT AND HARD ASSETS

(71) Applicant: Sequent Software, Inc., Santa Clara, CA (US)

(72) Inventors: Joan Ziegler, Menlo Park, CA (US); Richard Sergio Nassar, San Mateo, CA (US); Darin Nelson, Seattle, WA (US); Neil Charles MacDonald, Edmonds (GB); William James Templeton-Steadman, Hemel Hempstead (GB)

(73) Assignee: SYQURX, INC, Menlo Park, CA (US)

( * ) Notice: Subject to any disclaimer, the term of this patent is extended or adjusted under 35 U.S.C. 154(b) by 61 days.

(21) Appl. No.: 17/367,301

(22) Filed: Jul. 2, 2021

Related U.S. Application Data

(60) Provisional application No. 63/047,922, filed on Jul. 3, 2020.

(51) Int. Cl.
*G06F 21/00* (2013.01)
*G06F 21/45* (2013.01)
*G06F 21/32* (2013.01)
*G06F 21/62* (2013.01)

(52) U.S. Cl.
CPC .............. *G06F 21/45* (2013.01); *G06F 21/32* (2013.01); *G06F 21/6245* (2013.01)

(58) Field of Classification Search
CPC ....... G06F 21/45; G06F 21/32; G06F 21/6245
See application file for complete search history.

(56) References Cited

U.S. PATENT DOCUMENTS

2017/0140174 A1* 5/2017 Lacey ................ G06Q 20/4016
2022/0405839 A1* 12/2022 Slowiak .............. G06F 21/6263

* cited by examiner

*Primary Examiner* — Jeffrey C Pwu
*Assistant Examiner* — William A Corum, Jr.
(74) *Attorney, Agent, or Firm* — Roy L Anderson

(57) ABSTRACT

A System Platform establishes a Genuine User ID ("GUID") (based upon input received from an Identity Management Source), creates a user profile for an Intended User, generates a unique data set based upon input associated with the user profile and a digital device it has registered to the Intended User, which is securely provisioned on the digital device. The output of the GUID in combination with the output of an algorithm in a provisioning application enables the digital device to respond to Access Requests at an Access Point. The response from the genuine Intended User's application on their genuine digital device produces a unique data package which combines the GUID, a device ID for the digital device and the output of the algorithm using the payload obtained from one or more data management sources. The unique data package can be tailored for many different uses by the intended user, including uses which are attended or unattended, with varying levels of security, and can or will have many different attributes, depending upon its use, including, but not limited to, value, authenticity, dynamic, secure, valid, reliable, customizable, rules & permission based, timely, on demand, and it can be time, geo or event based.

20 Claims, 10 Drawing Sheets

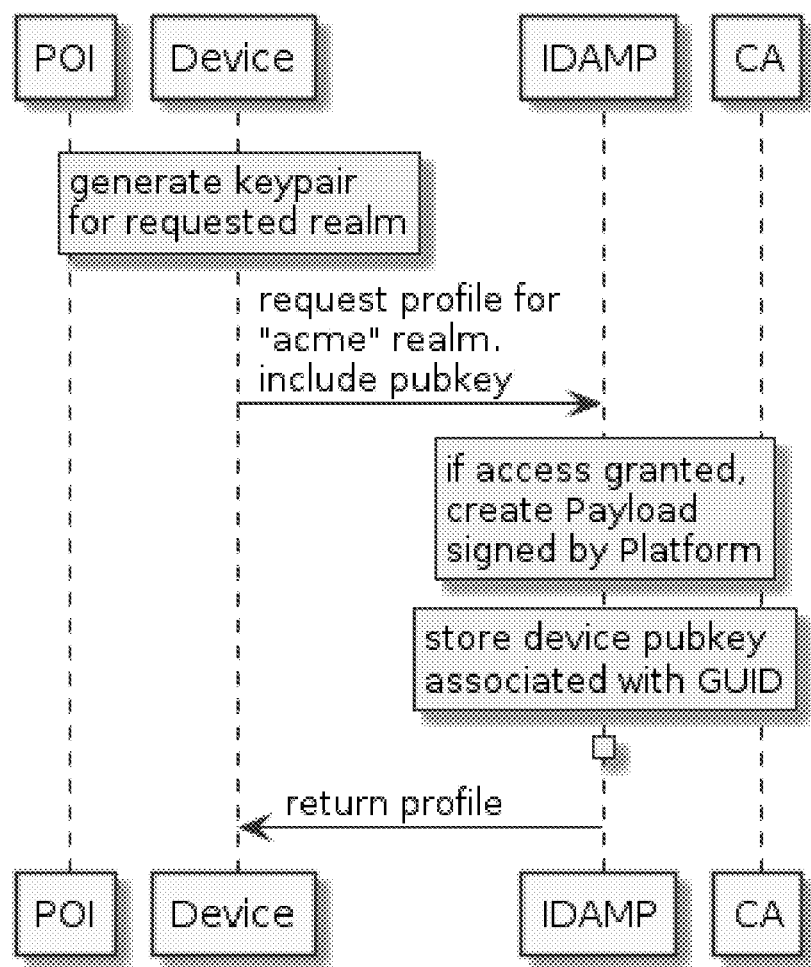

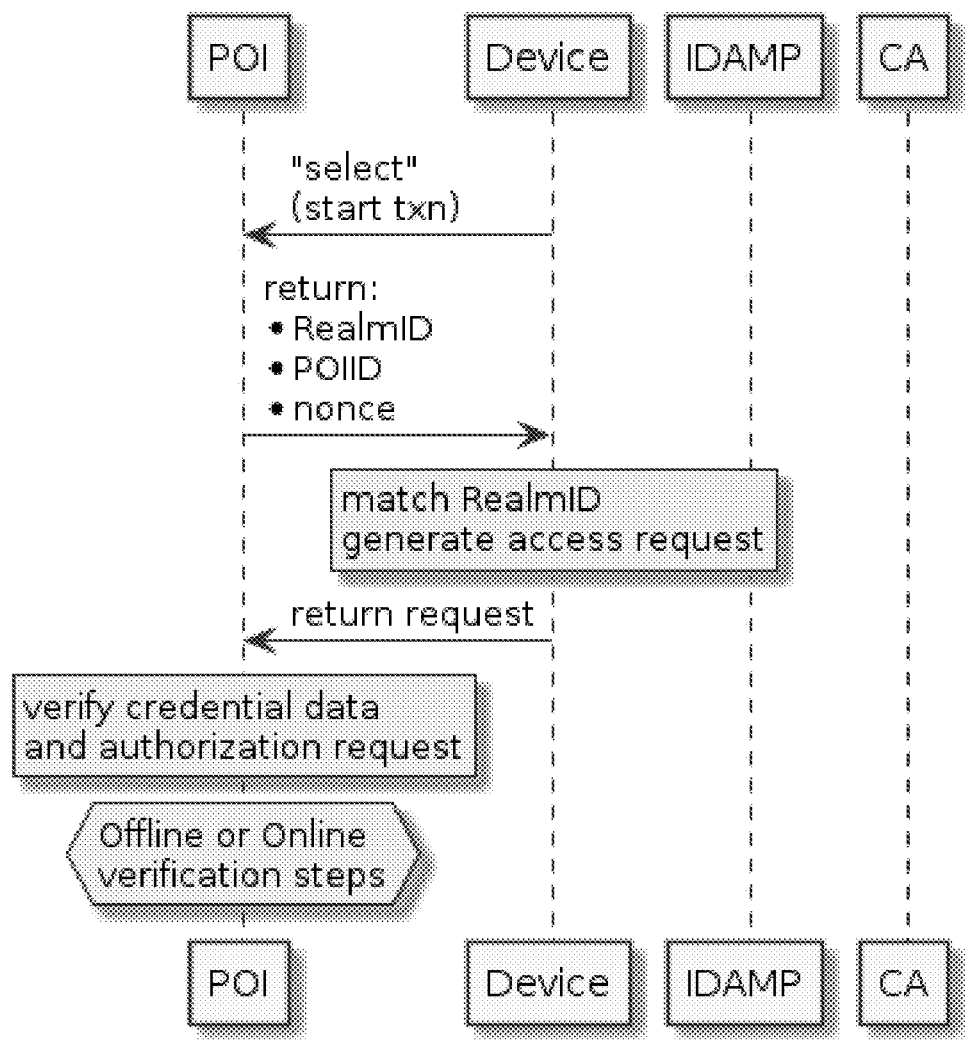

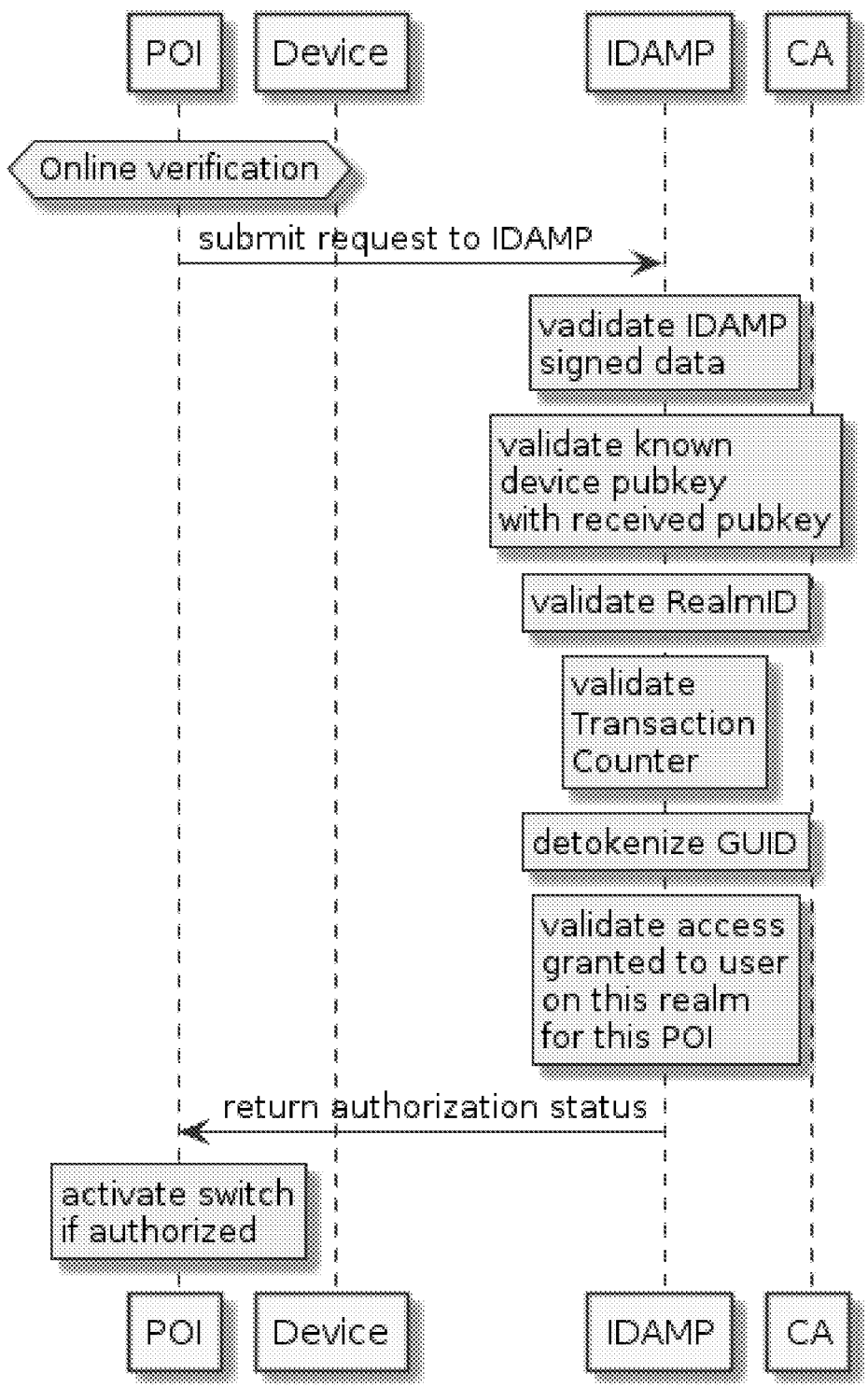

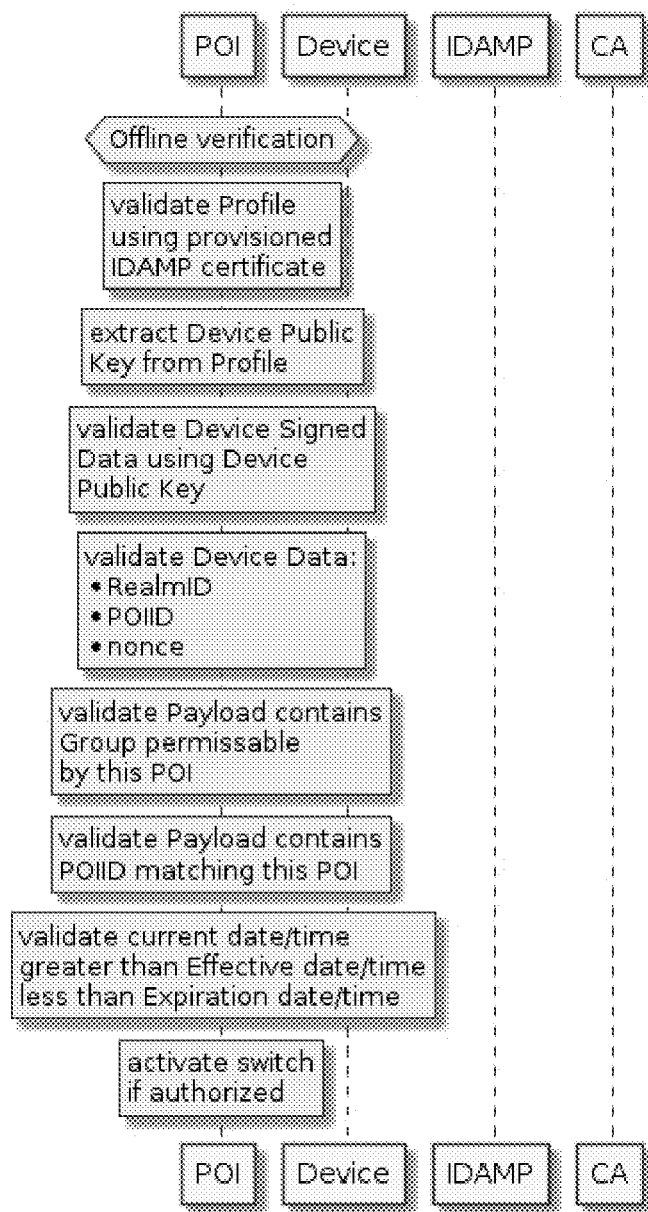

AUTHENTICATION AND AUTHORIZATION FOR ACCESS TO SOFT AND HARD ASSETS

CROSS REFERENCE TO RELATED APPLICATIONS

This application is a non-provisional application which claims priority from U.S. Ser. No. 63/047,922, filed Jul. 3, 2021, the disclosure of which is specifically incorporated herein by reference in its entirety.

FIELD OF THE INVENTION

The present invention is in the field of identification of an individual and authentication of digital data associated with that individual or digital data associated with a Controlling Party to provide digital access to both hard assets, such as, but not limited to, more secure areas within a property, campus, building, and access to soft assets, such as highly confidential files or medical files, which require privacy. The present invention enables the User, defined as the Genuine User or a Controlling Party to control their own personal or Controlling Party data to grant access to their physical hard assets and to control their associated digital information.

BACKGROUND OF THE INVENTION

Today access to hard assets is provided by physical metal keys, contactless card keys for door access, electronic keys (like Fast Track™ to pay tolls) or a card or mobile device to access subways. Access to electronic data is primarily provided by passwords, two factor authentication. Access can be made more secure by access controls in combination with biometric data, such as facial recognition, fingerprints, optical scan, voice recognition, to name a few.

Each of these means of access control have advantages and disadvantages, depending on the use. Some access control devices require a high level of assurance that the individual and the device are authentic, like making an electronic payment, whereas other access control devices do not require the individual's identity and the user remains anonymous such as access to a subway or bus. In addition, other access controls used for high security areas in government or private industry require absolute authentication of the individual. Some require high speed access based on the volume of throughput such as payments, while others are less time sensitive and require additional steps to authenticate the individual. Access to public transportation requires speedy processing time where millions of people use the subway system in Tokyo or New York City. Conversely, access to secure areas of a military base or access to highly secure documents in companies or government, put a heavier emphasis on authenticating the individual being given access.

The weaknesses of metal keys and access control card keys are that they are easily compromised. If even momentarily they fall into the wrong hands, a nefarious individual can make a copy of the key to gain access.

The points of access to physical hard assets and/or soft digital soft assets that relies on passwords has exposed many ways that a password can be compromised from writing the password or digital theft through "man in the middle" attacks like keyboard sniffers or cameras exposing the key entry. Two factor authentication has provided greater security but remains susceptible to "man-in-the-middle" attacks. Depending on the value of the access being protected, fraudsters and hackers have found several ways to compromise these systems.

SUMMARY OF THE INVENTION

The present invention is generally directed to a method for the User (Genuine User or Controlling Party) to establish and associate two inputs to provide digital access to either hard assets, like a building, venue, property etc., or soft assets, like digital files, or to enable the User to provide another entity to gain access to his/her or their Digital Data Records.

The first input is an Identify Management Source to establish a Genuine User ID ("GUID") that represents the Intended User of the system. The second input is a connection to a Data Management Source or several Data Management Sources to associate a Digital Data Record (the Payload) that is owned or controlled by the User. These two inputs are instantiated/established on a Software Platform to enable access.

The GUID must be established with a high level of assurance to ensure the Intended User is who he/she purports themselves to be, which means that the Intended User is in fact the Genuine User for whom the GUID is established. The GUID is essential to enable repudiation whenever the User associates Digital Data Records to gain access to either hard assets or soft assets or when the Access Point is entitled to receive an Identity Element ("IE") or the Payload. THE GUID ensures the Genuine Identity while preserving privacy. The GUID may be comprised of one or more IE. IE may include, but are not limited to name, address, government ID number, age, sex, birthdate, vaccines, or any other Personally Identifiable Information (PII). Each IE may be held in the digital equivalent of separate Safety Deposit Boxes. Only the GUID enables a User to share one or more IE.

The second input is obtained from a Data Management Source which establishes genuine Digital Data Record(s) (the Payload) under the control of the User. The User selects which of his/her or their IE or User's Payload may be associated with the GUID and provided to a Control Point. The User may control digital assets like, but not limited to, health records, vaccine record, financial record(s), security clearance certificate, educational record, military record, business records, PII data over the Internet, to name a few. The User of the GUID may associate IE at a Control Point.

Any Payload or IE may have a limited term of use based on Rules and Permissions set when establishing the GUID or Payload on the Transaction Platform. The User, whether it is the Genuine User or a Controlling Party, controls the Rules and Permissions associated with their IE or Payload.

Once established, the Rules and Permissions associated with the IE inputs, the GUID and the Payload inputs enable access at a Control Point. The access can preserve the Intended User's privacy or reveal PII.

The appropriate IE or Payload will be useful to grant access to:
   A concert or festival venue; workplace; military base; an automobile, transportation such as plane, train, bus, subway etc. Each may require additional levels of assurance by other means, such as one or more of the Identity elements (e.g., Date of Birth, Sex, Photo, biometric verification, and other means described below).
   Digital (aka soft) assets include, but are not limited to, electronic health records, educational records, professional certifications, company, military, or government files, or other Digital Data Records, e.g., vaccine records, antibody test certificate. These digital assets will be associated with Rules and Permissions and a term for use. Each may require additional levels of assurance by other means as described herein.

In addition, the User may enable another entity access to some or all of the User's GUID Identity Elements or Payload Digital records controlled by the User. Examples. The User may grant a Payload of the User's Electronic Health Record to a new physician, or for a telemedicine visit or a medical tourism procedure. Alternatively, that same User may grant information for analysis, granting access to medical records about a specific illness in conjunction with certain Identity Elements like sex, age, geographic area while ensuring PII like name, address and phone number are not exposed. For another entity to gain access to either the GUID Identify Elements or Payload, the User may configure Rules and Permissions on what may be accessed. Depending on the entity, the User may require additional levels of assurance by other means as described herein. In addition, the User may configure rules and permissions to control access to shared workspaces (like WeWorks, Plug and Play) or shared workplaces (like film editing, sound engineering, lab space, etc.). The User can digitally provide access to shared cars like ZipCar for certain hours on certain days or fleets used for delivery like Amazon, long haul fleets for freight or shared auto pools for police, companies, military, etc.

The present invention is generally directed to a method for providing one or more secure transactions on behalf of the User requiring the User's GUID in combination with an algorithm or cryptogram to enable the User to present credentials to gain access to hard assets or soft assets. The level of assurance of the GUID will increase based on the algorithm and/or other forms of stepped up authentication like two-factor authentication, biometrics or other combinations of data known only to the User. This Use Case will enable the User to communicate an Identity Element or Payload at an attended or unattended reader depending on the use case. This example would occur when a User is given access to a workplace or restaurant by establishing the User has either had a vaccine or has an antibody so as to allow the User access to public places.

Accordingly, it is a primary object of the present invention to provide a method for authenticating an individual and a cryptogram and a digital device ID for use to gain access to a hard or soft asset.

This and further objects and advantages will be apparent to those skilled in the art in connection with the detailed description of the preferred embodiment set forth below.

BRIEF DESCRIPTION OF THE DRAWINGS

FIGS. 6-10 describe online and offline data flows between an Identity Management Platform, a Digital Device, and a Point of Interaction, in accordance with the present invention.

DETAILED DESCRIPTION OF THE INVENTION

Figure 1:
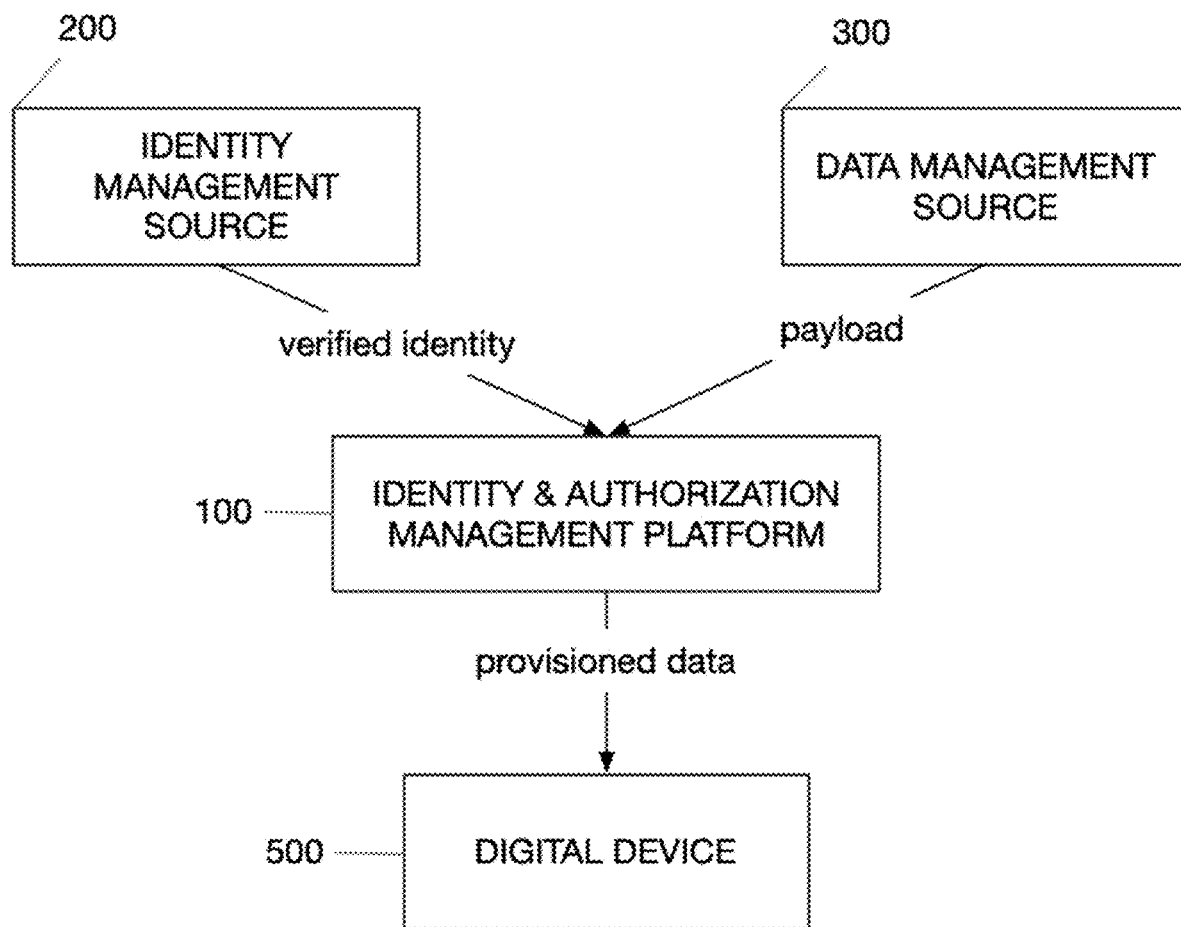
FIG. 1 is a high-level system flow block diagram for establishing the Identity and Authorization Platform used in accordance with the present invention.

In the event access control requires authentication of the individual, it is imperative that the access control device provide several elements:
1. Assurance the individual using the device(s) is the authentic intended user;
2. Assurance that the genuine device is used to gain access; and
3. Assurance any data used to gain access is authentic (is not spoofed) and remains valid for the user for the intended period (and possibly use).

It is also imperative that access control can be customized to accommodate different use cases which may require different levels of assurances.

The present invention focuses on these required assurances to protect access control whether it is a physical location or access to data; contemplates usage in attended access points and unattended access points; and addresses the sensitivity to each of these assurances to ensure they are both reliable and valid.

As the world converts from the information age to the digital age, there is a mounting need to provide a comprehensive, integrated, complete solution of all of these assurances for many forms of access control including, but not limited to, access control on physical campuses (whether it is a military base or private enterprise and many others). Equally, if not more important, is access control that protects the privacy of PII associated with health records, company records, financial matters, and other digital assets. These assurances preclude the growing concerns in the midst of ever-increasing attacks by hackers who do it for the fun of penetrating highly sensitive areas or records. Equally concerning are the pursuits of nefarious hackers who hijack many types of digital assets and hold companies or governments hostage until they pay ransom.

Many existing security protocols have been created to provide adequate solutions addressing one or two of these assurances. Despite the efforts of some of the greatest minds and most successful companies in the world, there are no solutions that deliver on all elements of the assurances of the genuine Intended User while securitizing the IE and the Payload data. Hackers and fraudsters continue to identify the weakest link and continue to find ways to compromise access control solutions. There are many reasons for the failures the hackers have exploited. Some are related to social engineering, defeating these security systems. Some of the obvious reasons are absence of comprehensive and layered security where the system can be compromised. Oftentimes, failure to ensure ease of use and non-disruptive operations slows adoption and usage or encourages users to shortcut their own systems. Both public operations and private enterprise have been slow to keep up with the digital transformation and change or embrace new technology and/or procedures. As a result, many efforts, including several potentially promising efforts, have met with failure.

As digital transformation proliferates across every industry, there is mounting concern about the digital transformation. The media has highlighted cases of companies' data being held for ransom and other means of extracting value from digital data. Accordingly, there is a very real, urgent need to provide the three assurances. These three assurances must be provided in a flexible platform that can be adapted for many different applications.

The present invention seeks to provide new methods for meeting the three required assurances:

1. Assuring the intended user is authentic and some or all of the IE can be securely stored and accessed as needed. Relying on Know Your Customer (KYC) procedures and processes, the present invention can be used for access control authenticating individuals for company identification, personal Electronic Health Records (EHR) access, automobile keys, hotel room keys, and the like;
2. Assuring the genuine digital device(s), whether a mobile phone, Internet of Things (IoT) device, smart watch, or other digital device, is used to gain access; and
3. Assuring the data used to gain access is authentic (is not spoofed) and remains valid for the user for the intended period.

A high-level system flow block diagram of the broad system processes of the present invention is set forth in FIG. 1. An ID & Authorization Management Platform (System Platform) communicates with an Identity Management Source (GUID Verification Source) and Data Management Sources and provides a Provisioning Application for each Digital Device. ID & Authorization Management Platform also goes through an Authentication Process for each Digital Device through use of the Provisioning Application.

GUID Verification Source 200 authenticates an Intended User is in fact the Genuine User with System Platform 100 and System Platform 100 creates a Genuine User Identification (GUID) for the Intended User while establishing ID Elements associated with the GUID and rules for their use. System Platform 100 also establishes one or more Payloads, which may be obtained from one or more Data Management Sources 300. System Platform 100 also provisions a specific Digital Device 500 with a digital ID (DID) with a Provisioning Application and seeds an algorithm and/or cryptogram used by the Provisioning Application. Once a Digital Device 500 has been provisioned with a Provisioning Application, System Platform 100 performs an authentication process which allows release of one or more Payloads to said Digital Device 500 while enforcing any rules on delivery of said Payload(s).

It is especially preferred that Digital Device 500 be a communication device having a user interface, short proximity electromagnetic communication device and mobile network interface for connection to at least one mobile network operator, all of which are described in greater detail in U.S. Pat. No. 10,496,832, the disclosure of which is specifically incorporated herein by reference in its entirety.

It is also especially preferred that System Platform 100, GUID Verification Source 200 and Data Management Sources 300 have a server operably communicating with one or more client devices. The server for System Platform 100 is also in operable communication with GUID Verification Source 200, Data Management Sources 300, and one or more Digital Devices 500, as well as Points of Interaction (defined later herein). Such servers may comprise one or more general-purpose computers that implement the procedures and functions needed to run a system back office in serial or in parallel on the same computer or across a local or wide area network distributed on a plurality of computers and may even be located "in the cloud," and any such server is operably associated with mass memory that stores program code and data, all of which is described in greater detail in in U.S. Pat. No. 10,496,832, the disclosure of which is specifically incorporated herein by reference in its entirety In accordance with the present invention, there is an initial registration process for an intended user and a provisioning process for a Digital Device to be used by the intended user. The initial registration process establishes the Intended User is really who they say they are and binds the intended user to a GUID and a Digital Device. During this process, the following steps will take place:

Know Your Customer (KYC) Process—this is how an entity will validate the intended user as part of Identity Management or Identity and Access Management ("IdM"). There are various ways to accomplish this and the way which is chosen can be dependent on the necessary assurance level of identity and the entity requirements. Selection of a particular IdM is not critical to the present invention and a person of ordinary skill in the art will recognize that System Platform 100 can plug into an existing IdM or use future IdM as it becomes available.

Account Creation—This creates a user profile for the Intended User in System Platform 100 and establishes a setup of fixed variables and authentication variables. The profile will have:

Authentication Variables—items used to authenticate the account/profile (e.g., login credential)

Fixed Variables—items that do not change over time (e.g., a user ID, birthdate, social security number)

Dynamic Variables—variables which change over time (e.g., temperature, blood pressure, glucose level in blood, immunity, or immunization, etc.)

Mapping Variables—mapping multiple elements of the GUID for the intended user. The processing engine can take into account the context of the presentation (ID, by location, reader ID, etc,) and based on that information authorize use of the mapping variable. This will map to a loyalty card, payment card, access token, etc.

The profile will also, preferably, have a counter for use in cryptographic functions, such as creating an algorithm to protect sensitive data such as certain Identity Elements (which may reveal the identity of the Intended User) and/or Payload data.

Device Registration—Binding device/application ID information to the intended user account—this is used for risk profiling and cryptogram generation and mapping. During this step, a DID from Digital Device 500 is received in System Platform 100 and, if desired, Digital Device 500 may be assigned its own Digital Tracking ID within System Platform 100.

Cryptogram Mapping—Generating a Cryptogram within System Platform 100 that is bound to the intended user profile and unique based on device/app. This helps with authentication assurance and loss of device Entitlements—This step within System Platform 100 is the process of granting a profile access to a resource Digital Issuance of Cryptogram (Provisioning)—securely Provision and store cryptogram to a Provisioning Application within System Platform 100 which is then securely stored on a Digital Device 500 via a Software Development Kit or Application Programming Interface. During this step System Platform 100 generates the cryptogram and the keys necessary to authenticate which is unique per an individual Digital Device 500. The cryptogram can be configured to be time based and limited to x number of uses before a replenish is needed and/or can be set so it is only valid for certain times of day or geo locations (this requires geo location on the reader used during an Access Request (discussed later) and not necessarily on the Digital Device 500 presenting the credential).

This step can also include:
Replenish/update of crypto
Update of personalization (Perso) file
Generation of dynamic Perso file—field level encryption on portion of Perso file. These are used to authorize basic access The Provisioning Application is setup on a Digital Device 500 by establishing a secure trusted communication channel and then loading a Software Development Kit or Application Programming Interface into memory of the Digital Device, the details of which would be known to a person of ordinary skill in the art.

Once an Intended User has a GUID and a Digital Device 500 which has been Provisioned with a Provisioning Application, the Intended User is now in a position to begin an Access Request Process which begins when the Intended User uses Digital Device 500 to present credentials to a Point of Interaction (POI). The credentials can be passed over any accepted communication protocol. What is important is the payload that comes across. The payload can have a User Interface ("UI") to allow the Intended User to add some context of what the intended user wants leveraging discretionary options, e.g., use points, loyalty card, etc. A Point of Interaction is an access point where Digital Device 500 can be read, and local authentication and authorization can take place. Some illustrative examples of local authentication and authorization include using Offline Authentication and Authorization and passing information received from Digital Device 500 to a network to perform authentication.

An Access Request to a venue, services, place, or assets (hard and soft assets) can be considered as falling into three major categories: No authentication or authorization needed for access, unattended access authentication and attended access authorization.

The first major Access Request category of no authentication or authorization need for access can be used to provide access to areas or places where no authentication is needed, e.g., a low-risk building or low-public-density public parks or open spaces. For such locations, no authentication may be needed, but there may just be a need to sign in for use. In such a location, all that is needed to know is that somebody walked in and the same person walked out—maybe used to keep a count of how many people are allowed to be in area, possibly for fire regulations and safety, and to know if anybody is still there or whether everybody who entered is accounted for, which can be especially useful for emergency evacuation purposes, such as in a fire or active shooter scenario. Such access might also be used to limit people time to events, e.g., you have 30 minutes to walk around as time approaches system can send an auto reminder—this can be used for parking meters or any time-based reminders. It can also be used to tie multimodes of transportation, e.g., park car at train lot, ride train, come back and get charged for both parking space and train. (The Intended User would need to tap in tap out and tap along the train rides.) It can also be used to tap in and tap out for payments (double tap) or be used to register a user. It might also be used for more low value, high volume types of access, e.g., cardio readings. In connection with this category, the geographical location of such sign in can be recorded locally on the user's digital device. Such stored access might help users understand if they have been exposed to a contagion at a specified geographical location at a specified time; in business settings, it can be used for security check-ins or delivery check-ins.

For the second two categories, both could be attended or not attended. What is important is whether there is a need for higher level of assurance. It should be a combination of both and then in both instances it could be private or PII could be revealed.

All of these Use Cases have a higher level of security with an Algorithm.

|  | Private | PII known |
| --- | --- | --- |
| Simple Assurance for GUID | Attended or Non-attended | Attended or Non-attended |
| Higher level of Assurance | Attended or Non-attended | Attended or Non-attended |

The second major Access Request category of unattended access authorization relies upon a session of the access credential—a cryptogram—which is enough to Authenticate the Intended User is who they say they are, and an encrypted payload is passed with a Boolean or non-personally identifiable data element response or with information from which personal information of the user can be identified. For example, once the credential is authenticated, authorization (access to a store) is in the encrypted response, yes, the user has immunity to COVID-19. In this type of scenario, the access credential authentication and authorization can be conducted at the Point of Interaction terminal which would allow for millisecond access. The benefit of this Access Request is a human does not need to be involved in verification or the user trying to gain access—this allows for rapid access while ensuring only a qualified user (authenticated and authorized) can gain access to the facility. This is to allow access to a place where you don't need to know any personal info about a user, an example of which is that you just need to know if the user can enter (e.g., is at least 21 years old or has immunity of COVID-19). After the user satisfies one or more predefined criteria, the user is allowed access during a predefined time period. A token and crypto is used to authenticate that the criteria passed belongs to the intended user and the intended user is who they say they are. User validation is based on KYC done during registration. This category of Access Request can be thought of as an extension of no authentication needed, all the use cases in that area can apply here. E.g., this can be used for low or medium value high volume access, Mobility as a Service, etc.

The third major Access Request category of attended access authorization requires a higher level of assurance then just passing a cryptogram and will require, for example photo ID or response to some personal questions. Within this Access Request category information about the identity of the user can be kept private or portions of such information can be revealed. The cryptogram will still be used to authenticate the User anonymously, but in addition to the anonymous authentication it will be used to retrieve an additional pre-authenticated data element such as photo or passphrase. This information will be retrieved from the KYC owner and only presented with the user's Crypto to a 3rd party verifier such as a human-gate-attendant or Facial Biometric gate apparatus (such as airport border security face scanner/gate). This category of Access Request can be thought of as an extension of the unattended access, but here the intended user needs a high level of assurance to validate who they are. The additional factor used to authenticate the user will come from the KYC setup and the user will NOT provide this. In this particular category of Access Request, security is more important than speed, and it can be used for more high value, low volume access.

A Digital Device used to make an Access Request can have a screen, such as a mobile phone, laptop, tablet or watch, phone, or a device without a display (e.g., ring, key fob, card, tag) which can be paired with a smart device to pass the credential over to the Point of Interaction. In some cases, where information transmitted from the Digital Device is simple, such as a binary yes/no answer, or a simple data point (e.g., age, authorization level, timed access window, and the like), the information can be transmitted from the Digital Device by simply tapping the smart device to gain access. When multifactor identification is used, it can be made as frictionless as possible by a Digital Device which presents the credential only after the Digital Device has been unlocked (something they know or are) by the owner (biometric or passcode) and then the token and cryptogram (something they have) can get passed to the reader Authentication of crypto and token combo necessary to validate.

Figure 2:
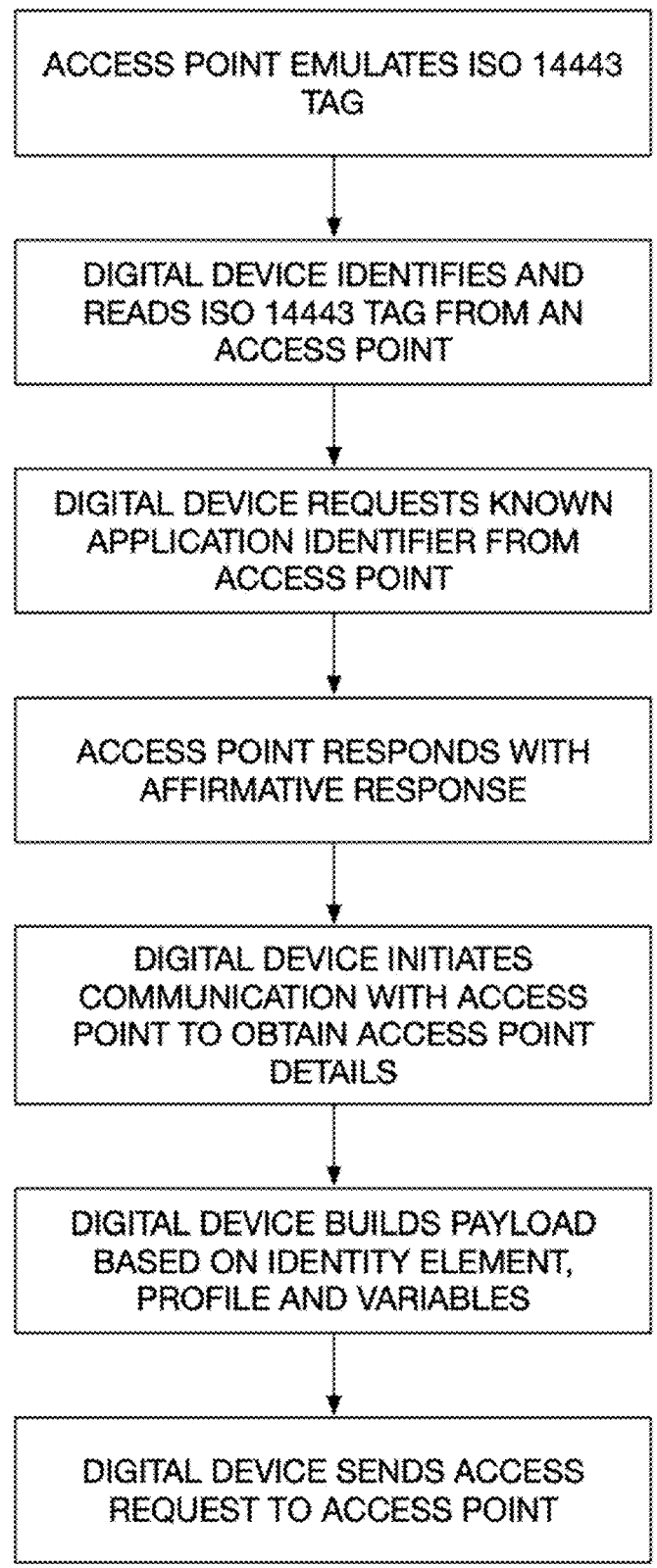
FIG. 2 is a flow diagram of communications between a Point of Interaction and a Digital Device which lead up to a An Access Request according to the present invention.
Figure 3:
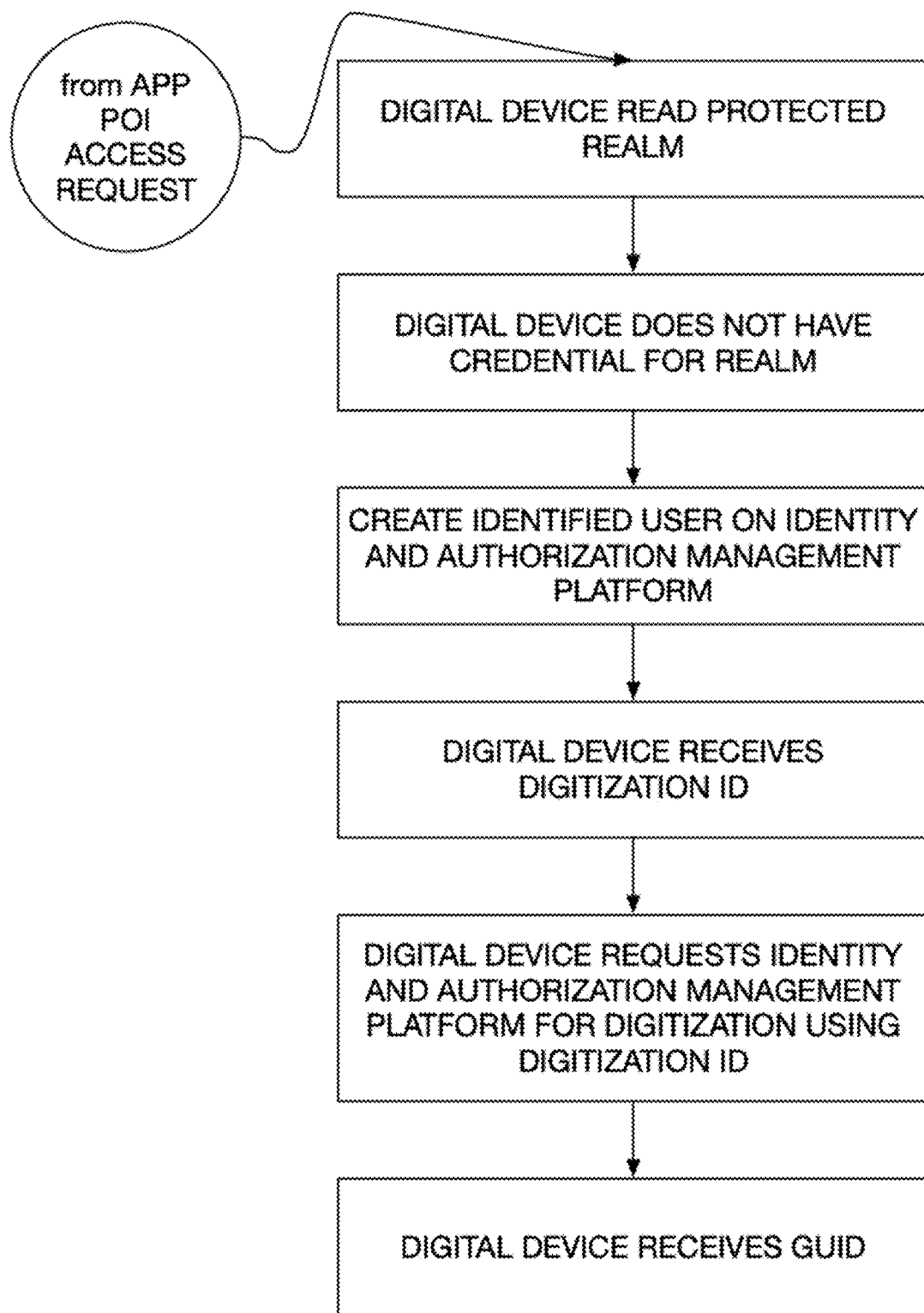
FIGS. 3-5 illustrate steps taken according to the present invention when, respectively, a Digital Device is not already provisioned with a necessary credential to gain access to a resource at a Point of Interaction, and when such access is sought offline or online.
Figure 4:
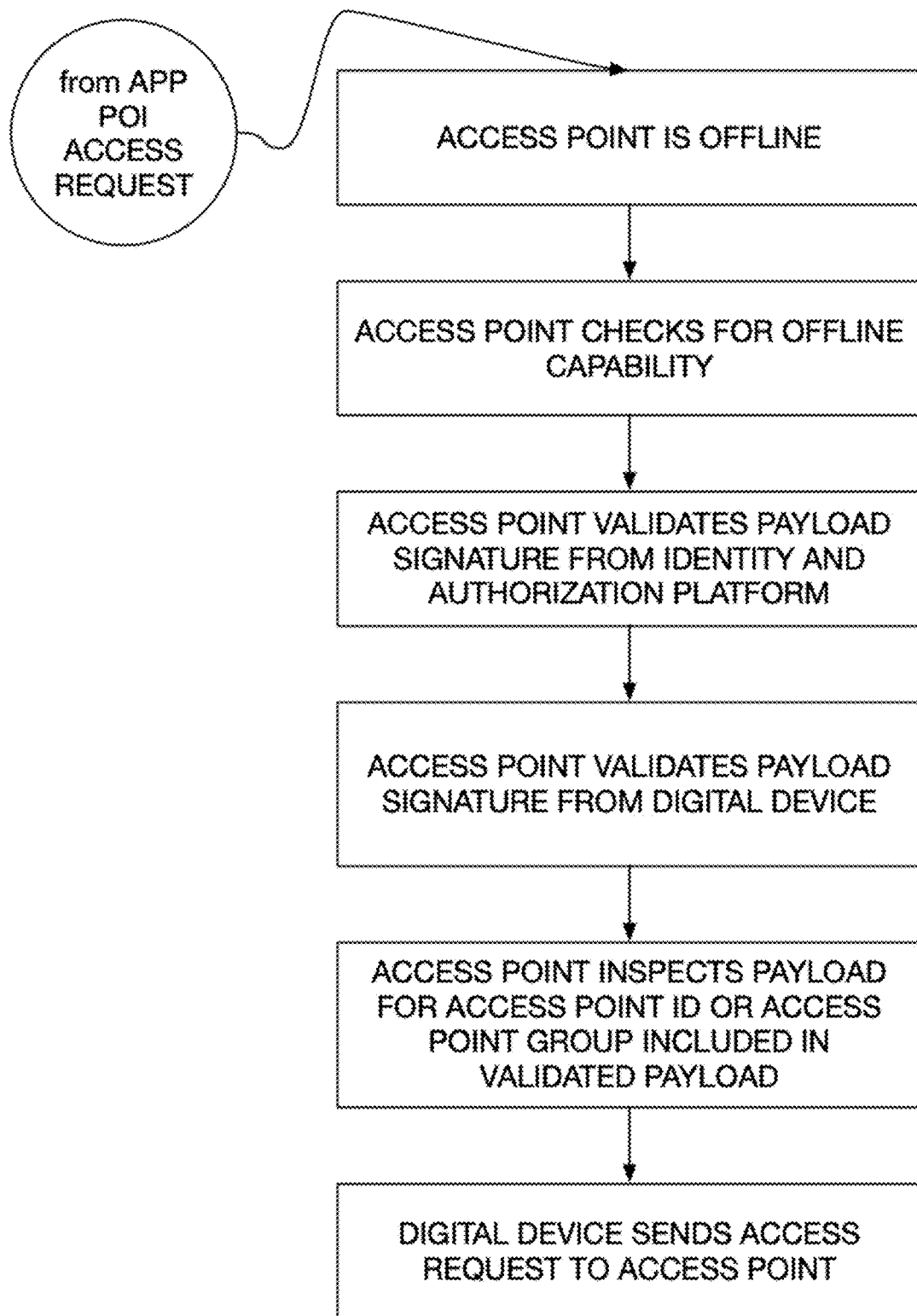
Figure 5:
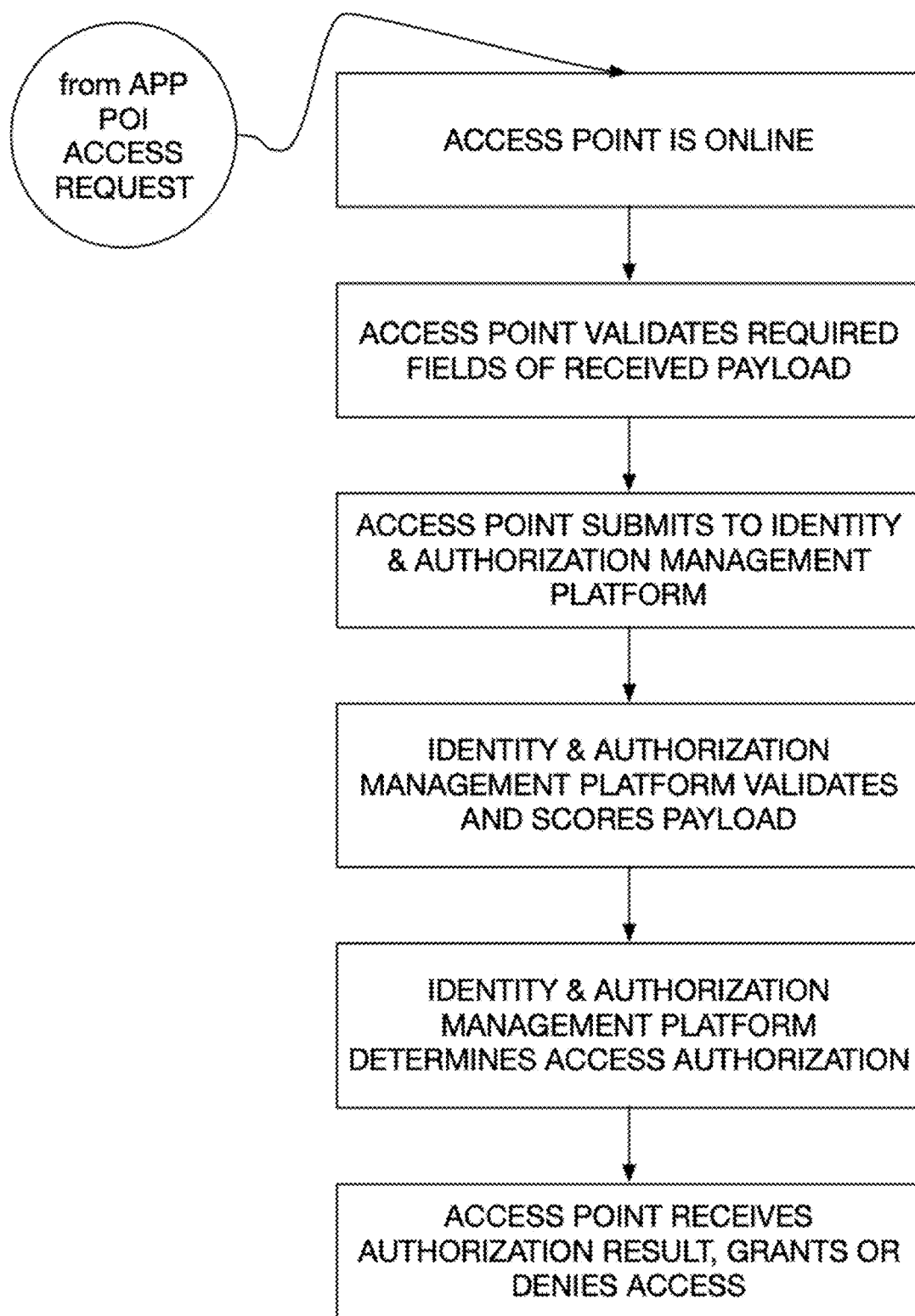
Figure 6:
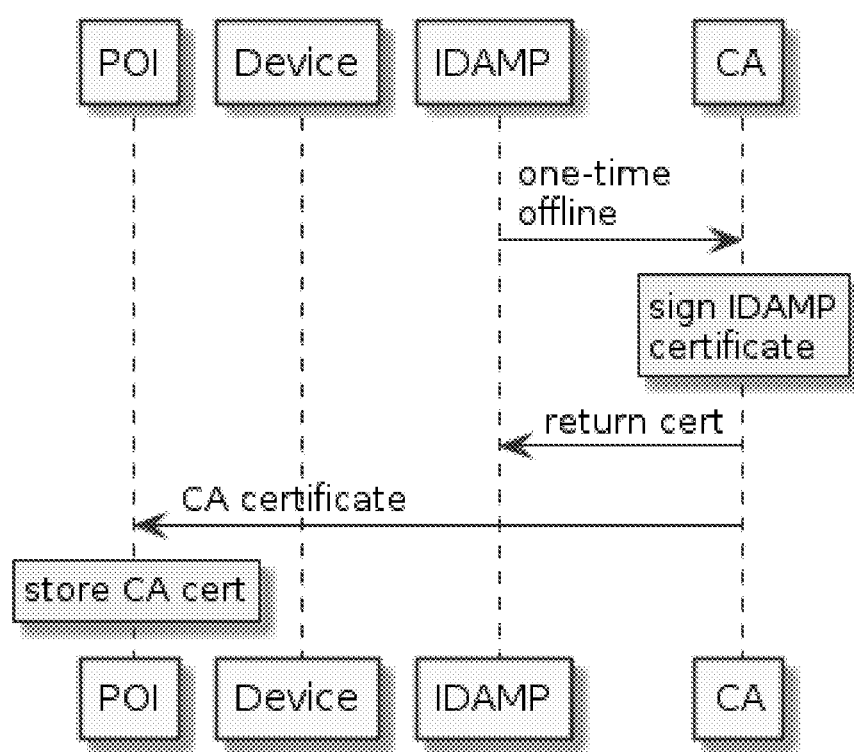

Communications between a Point of Interaction and a Digital Device which lead up to a An Access Request are illustrated in FIG. 2. FIG. 3 illustrates the steps which take place if the Digital Device does not have a credential for an asset for which access entry is sought. When the Digital Device does have a credential for accessing an asset (through a prior provisioning operation), access is sought either through an offline process (illustrated in FIG. 4) or through an online process (illustrated in FIG. 5).

The present invention will now be described in further detail by referencing the scenario of an Intender User who is seeking access to a physical (or hard asset), rather than a soft asset, through a Point of Interaction; in this scenario, access to a hard asset is controlled by a physical switch. In this illustrative (but not limiting) scenario, a physical switch can be a smart switch (having its own electronic processor and controls, along with its own executable software or code) or any physical device, mechanism or means used to grant access to the asset. For example, if entry through a door is desired, the physical switch may control one or more locks. In another example, the physical switch may be a lock to a box or container which itself contains something which controls access—for example, the physical switch may control access to a lock box in which a set of keys is stored, and then the keys can be used to turn on a lock, such as that of a car or other piece of machinery, and such keys might be smart keys or simply plain old metal keys. In another example, the physical switch might control access to a physical token which itself can then be used to gain access to the asset (such as through a subway turnstile) or to a digital token, such as a bar code or QR code, which can be used to gain access, In yet another example, the physical switch might control a delivery mechanism for providing the physical or hard asset to the User (in much the same way a vending machine delivers items when the appropriate sum has been paid for such delivery), and the Point of Interaction can provide traceability and security for delivery of sensitive assets, illustrative examples of which include restricted items such as drugs and alcohol and high value items, such as items purchases online which are being picked up from a pickup location. Because cell phones are more or less ubiquitous at the present time, and most smart cell phones have NFC capability, it will be useful to further describe the invention by reference to the non-limiting case of a mobile smart phone (which may have either an Android or iOS operating system) which uses NFC. Also, as will be described in greater detail below, it is worth noting that either an Android or iOS operating system will work the same way with NFC and the protocol hereinafter set forth.

In an especially preferred (but non-limiting) embodiment, NFC communications between a Digital Device and a Point of Interaction are facilitated by setting the Point of Interaction to emulate an ISO 14443 tag with a configured payload identifiable by standard readers. A standard reader is an NFC enabled reader that conforms to the ISO protocols necessary to read an ISO 14443 tag. (An ISO 14443 tag is described in ISO/IEC 14443, the contents of which is specifically incorporated herein by reference in its entirety.) The Point of Interaction waits for an NFC field trigger indicating a nearby reader. Once triggered, the Point of Interaction emulates the ISO 14443 tag payload.

A Digital Device which generated the field reads the ISO 14443 payload and determines whether there is an application registered to handle the payload. In the case where no such application is registered, the default Digital Device behavior continues which might include navigation to a mobile site associated with the asset being protected by Point of Interaction. In the case where an application is registered with the payload, the Digital Device would have had the application installed and configured which includes setting an international Application Identifier (AID) of interest and configuring the Digital Device to scan for ISO 14443 payloads and associate with the application. When the application is activated by Digital Device 500, Digital Device 500 performs a Select on a specific international AID. Point of Interaction responds with a proprietary File Control Information (FCI) template. Application requests detailed data from the Point of Interaction which responds with a Point of Interaction ID, Security Realm ID and an unpredictable number ("nonce"). Application creates an Access Request payload using the algorithm described and submits to the Point of Interaction.

There may be times and applications where a Digital Device cannot or does not communicate through a Point of Interaction with System Platform 100, such as a remote location where there is no reliable network connectivity, or applications in high throughput areas that only need a low level of assurance that a user/account is valid; in such situations, an Offline Data Authentication reader can interact with Digital Device 500 to authenticate that a user account and the Digital Device are valid. A cache of information needed to authenticate Digital Device 500 can be preloaded to Offline Data Authentication reader while Digital Device 500 can be preloaded with specific data. Communication between Offline Data Authentication reader and Digital Device 500 can be over NFC, RFID, BLE, Bluetooth, or the like, and is done based on the pre-loaded data by creating a type of mutual Secure Sockets Layer, where Offline Data Authentication reader has portion of the certification and Digital Device 500 has another portion of the certification. Once communication is established, a payload passed by Digital Device 500 has a crypto to authenticate the user through use of a cryptogram vault in Offline Data Authentication reader while a cryptographic hash function can be used for mutual authentication.

The Algorithm is used in Digital Device 500 to generate an Access Request cryptogram and in Identity & Authorization Management Platform 100 to validate the Access Request. An example of an especially preferred algorithm, which is not meant to be limiting, but is meant solely to be illustrative, is based on ISO/IEC 9797-1 MAC algorithm 3 set forth in ISO/IEC 9797-1, the disclosure of which is specifically incorporated herein by reference in its entirety. The keys K and K1 are the most significant 8-bytes and least significate 8 bytes of the Limited Use Key. The Limited Use Key is shared between Digital Device 500 and Identity & Authorization Management Platform 100 during setup and updated after a configured number of uses of the LUK have transpired. This key is generated by Identity & Authorization Management Platform 100 which is specific to each digital device. The input to the algorithm is a combination of data values originating from Digital Device 500 and the Point of Interaction. The Digital Device provides a Transaction Counter and the GUID. The Point of Interaction provides its Point of Interaction ID, the Security Realm ID, and a 4-byte nonce.

In typical online operational mode for an access authorization transaction, Point of Interaction validates required data of an access request payload and upon identifying no issues, submits the access request payload to Identity & Authorization Management Platform. Identity & Authorization Management Platform inspects Payload to identify the configuration data associated with the GUID and the Digital Device previously registered with the Identity & Authorization Management Platform and the keys shared with the device. The access request cryptogram is validated against data known for this GUID and Digital Device. The Transaction Counter provided in the payload is verified against the Identity & Authorization Management Platform's tracked Transaction Counter for this Digital Device. The GUID is replaced with the previously established User mapped to the GUID.

Additional details about the invention will now be provided by setting forth a non-limiting description of online and offline access flows illustrated in FIGS. 6-10 which take place involving an Identity & Authorization Management Platform (IDAMP), a Digital Device (Device), a Point of Interaction (POI) (which is protecting a hard asset) and a designated Certificate Authority (CA).

Initial State.

Before a specific Access Request is generated, IDAMP securely creates a public/private keypair for every Realm it is managing. A Realm is a logical construct defining a set of Points of Interactions (POIs). A POI can be configured to only one Realm. A Point of Interaction Identifier (POIID) is unique to a Realm. The keypair is used with the Realm and other data specific to the IDAMP to create a Public Key Certificate and is signed by a designated Certificate Authority (see FIG. 6). This IDAMP Certificate is sharable with all POI configured to protect an asset of the Realm stated on the IDAMP Certificate.

A Digital Device is provisioned with a mobile device application configured to use this IDAMP. The Digital Device has been enrolled with IDAMP and has established trust between it and the IDAMP. (Steps necessary to do this have already been described and are not described in this data flow description.)

Provisioning Request.

The Digital Device wants request access to one or more assets in this Realm. The Digital Device uses its internal Keystore mechanism, widely available on all digital mobile devices, to generate a public/private keypair. The public component of the keypair (Device Public Key) is sent to IDAMP along with the other required components of an access request.

Creating the Digital Data Record (Payload).

If IDAMP grants access to the assets of the realm to the user of the device, it creates a Digital Data Record (Payload) for this user on this device for this realm consisting of the following components:

| | Payload | |
|---|---|---|
| | Name | Type |
| Signed Data | RealmID | entity |
| | GUID | entity |
| | AccessGroupsList | array |
| | AccessablePOIsList | array |
| | EffectiveDateTime | entity |
| | ExpirationDateTime | entity |
| | TrustedPrimaryData | array |
| | TrustedDiscretionaryData | array |
| | DevicePublicKey | entity |
| Data | TrustedPayloadSignature | entity |
| | UntrustedPrimaryData | array |
| | UntrustedDiscrectionaryData | array |

The data elements RealmID, GUID, AccessGroupsList, AccessablePOIsList, EffectiveDateTime, ExpirationDateTime, TristedPrimaryData, TrustedDiscretionaryData and DevicePublicKey as combined are signed by the IDAMP with the IDAMP private key for this realm. The signature is then added as unsigned data Description of Items:

RealmID—the known unique identifier for this realm.

GUID—the tokenized representation of the user

AccessGroupsList—a list of "groups of POIs" specific to this realm which this user is allowed to access AccessablePOIsList—a list of specific POIs this specific user is allowed to access EffectiveDateTime—the exact time and date this Payload is considered active ExpirationDateTime—the exact time and date this Payload is no longer active TrustedPrimaryData—a list of tuples the 'keys' known and preconfigured TrustedDiscretionaryData— a list of tuples with configurable keys TrustedPayloadSignature—the signature of the combined above data items signed UntrustedPrimaryData—a list of tuples with 'keys' preconfigured. Not part of signature.

UntrustedDiscretionaryData— a list of tuples with configurable keys. Not part of signature.

TrustedPrimaryData, TrustedDiscretionaryData, UntrustedPrimaryData and UntrustedDiscretionary data all share the same format. Date of Birth (DOB) is an example of a known key/value pair that is established by the IDAMP and trustable if supplied.

| Trusted Primary Data Objects | |
|---|---|
| Name | Description |
| DOB | Date of Birth |
| TP1 | 1st Trusted Object |
| TP2 | 2nd Trusted Object |
| ... | |
| TPN | N'th Trusted Object |

The IDAMP sends the Payload to the Digital Device. Digital Device stores the Payload, but secure storage is not a requirement.

Common to Online and Offline Transactions.

The Mobile App does a Select to start transaction. The POI returns:

Its RealmID

Its POIID (sometimes called a resourceID—it's the unique identifier the POI is configured to have A nonce (random number—8 bytes currently)

The mobile app looks in its list of Payloads it has and tries to find one that matches this POI's RealmID. It finds it and can now create an Access Request Cryptogram. It builds this using both the data that the POI gave it as well as the Payload for this Realm. The 3 data items from the POI along with a Transaction Counter the Digital Device maintains are combined and the data is signed by the mobile application using the private key it generated previously for this realm. The resulting signature is added to the Transaction. The device also appends the combined signed fields on the Payload for this Realm as well as the IDAMP generated signature. The unsigned data in the UntrustedPrimaryData and UntrustedDiscretionaryData fields are not included. An Access Request Cryptogram sent from the Digital Device to the POI has the following elements.

| | Access Request Cryptogram | |
|---|---|---|
| | Name | Source |
| Device Signed Data | RealmID | POI |
| | POIID | POI |
| | nonce | POI |
| | TranscactionCounter | Device |
| | Device Payload Signature | Device |
| IDAMP Signed Data | RealmID | IDAMP |
| | GUID | IDAMP |
| | AccessGroupsList | IDAMP |
| | AccessablePOIsList | IDAMP |
| | EffectiveDateTime | IDAMP |
| | ExpirationDateTime | IDAMP |
| | TrustedPrimaryData | IDAMP |
| | TrustedDiscretionaryData | IDAMP |
| | DevicePublicKey | IDAMP |
| | IDAMP PayloadSignature | IDAMP |

The POI receives this Access Request Cryptogram.

Online Transaction Flow.

The POI determines based on configuration to do an Online Access Request Transaction. It simply submits this entire Transaction Request to its preconfigured IDAMP.

IDAMP retrieves the Device Public Key and Transaction Counter and acceptable Transaction Counter Range it has stored for this GUID/Realm combination. Using this key, it validates the Device Payload Signature. If this signature is correct ('checks out') the IDAMP can be assured the Device with this private key generated the Device Payload Signature.

IDAMP next validates the IDAMP signed data using the IDAMP PayloadSignature. If this signature is correct, the IDAMP can be assured these data fields are the same as it built when the Payload was issued to the device. Next it verifies that the DevicePublicKey matches the public key it retrieved for this device, that the RealmID matches the Device Signed RealmID and verifies Payload is active based on the current time and date between the effective and expiration dates. Finally, the IDAMP checks that the sent Transaction Counter against its stored Transaction Counter value does not differ from the stored Transaction Counter value more that the acceptable Transaction Counter Range. If these all are correct, IDAMP next detokenizes the GUID to retrieve the actual User behind the GUID.

Next the platform checks in its configuration that the following are all true:

The User is registered on this Realm

The User has been granted access to this specific POIID [Here there would be Other Options Like Doing Step-Up, Etc.]

IDAMP generates and sends an authorization ID and an authorization status (allowed/denied) to the POI. POI reads this response and activates the mechanical switch based on the status.

Offline Transaction Flow.

The POI also is able to do an Offline Access Request Transaction. This is useful when:

Cheaper hardware is sourced without network capability

No network exists in the POI's location

Network capability and network exist but the network is not available

When the POI retrieves the Transaction Payload from the Mobile Device and determines to do an Offline Access Request Transaction, it uses its provisioned IDAMP Certificates public key to verify the IDAMP Signed Data has not been altered. Once verified, the now trusted Device Public Key (part of the IDAMP Signed Data) is extracted and used to verify the Device Signed Data just created by the Mobile App. If this also is correct, the nonce is compared to the nonce just sent to the Mobile Device. If this the known nonce matches the sent nonce, the POI is assured that the device has the private key part of the keypair given to the IDAMP when the Payload was generated. It also knows that this is not a 'replay' since the nonce signed and returned matches the just generated nonce.

The POI then compares the RealmID to its configured RealmID it is protecting. These should and must match. Next it compares its configured allowable Access Group members settings against the list of AccessGroupsList from the IDAMP Signed Data. It also compares its POIID against the AccessablePOIsList. Finally, it compares that its known date and time fall between the EffectiveDateTime and the ExpirationDateTime, thus determining if the Payload is active.

The POI will allow access only if the following are all true:

The RealmID for the Payload matches the RealmID it is protecting

Either of the following:

The Payload is provisioned with a Group matching one of the Groups this POI allows, OR The Payload is provisioned with a POIID matching the POIID of this POI The known POI date/time is greater than the EffectiveDateTime The known POI date/time is less than the ExpirationDateTime The details of this access are stored in the POI for logging and analysis purposes later.

The foregoing description lends itself to a number of methods, some of which include in the following identified methods. These methods are not meant to be limiting; rather, they are merely illustrative, and a person of ordinary skill in the art will recognize that additional methods, not enumerated below, also fall within the scope of what has already been disclosed. The first set of methods are all performed on the Identity & Authorization Management Platform which is operated by at least one hardware processor and has a network connection, such as the Internet.

Method 1. A method for authentication and authorization of an Intended User of a digital device, implemented through use of an Identity & Authorization Management Platform operated by at least one hardware processor, comprising the steps of:

establishing a Genuine User ID ("GUID") for the Intended User based upon input received from an Identify Management Source, wherein the GUID is generated from a plurality of Identity Elements associated with the Intended User according to a GUID set of rules which establishes how many of the plurality of Identity Elements of the Intended User will be associated with the GUID for a preselected digital access use by the Intended User;

establishing at least one Payload from at least one genuine Digital Data Record associated with the Intended User for the preselected digital access use by the Intended User;

configuring an algorithm for use by the Intended User;

receiving a Device Identification from the digital device intended for use by the Intended User;

validating that the Intended User of the digital device is authorized to access the at least one Payload through use of the algorithm and the GUID; and provisioning the digital device with an access control application configured to authorize the preselected digital access use by the Intended User to access said at least one Payload.

Method 2. In addition to the method set forth in Method 1, the further steps of:

creating a user profile for the intended user, wherein the user profile is comprised of:

a plurality of authentication variables configured for use to authenticate a user account or the user profile;

a plurality of fixed variables which do not change over time;

a plurality of dynamic variables which change over time; and a plurality of mapping variables.

Method 3. The method set forth in Methods 1 or 2 wherein the user profile also includes a counter.

Method 4. The method set forth in Method 3 wherein the plurality of dynamic variables includes at least one secret.

Method 5. The method set forth in Method 4, wherein said at least one secret is known by the Intended User.

Method 6. The method set forth in Method 5 with the additional step of generating said at least one secret.

Method 7. The method set forth in Method 3 with the additional step of registering the digital device to the user profile.

Method 8. The method set forth in Method 3 with the additional step of linking the digital device to the GUID.

Method 9. The method set forth in either Method 7 or in Method 8 with the additional step of creating an algorithm to protect sensitive data and which is unique based upon input and associated with the user profile and the digital device.

Method 10. The method set forth in Method 9, wherein the sensitive data includes at least one Identity Element.

Method 11. The method set forth in Method 9, wherein the sensitive data includes at least one Payload.

Method 12. The method set forth in Method 11, with the further step of securely provisioning the digital device with output of the algorithm and associated with the GUID when provisioning the digital device with the access control application.

Method 13. The method set forth in Method 12, wherein the access control application is configured to allow an Access Request originating within the digital device to provide a Payload to an access point without needing authorization from the Identity & Authorization Management Platform.

Method 14. The method set forth in Method 13, wherein the Payload includes one of the plurality of Identity Elements associated with the Intended User.

Method 15. The method set forth in Method 14, wherein the Payload does not include a data element which can personally identify the Intended User.

Method 16. The method set forth in Method 13, wherein the Payload includes a pre-authenticated data element associated with the Intended User.

Method 17. The method set forth in Method 13, wherein the Payload includes a response to a Boolean query.

Method 18. The method set forth in Method 13, wherein the access control application is configured to record geographical information related to the access point.

Method 19. The method set forth in Method 13, wherein the access control application is configured to track time information related to the access point.

Method 20. The method set forth in Method 12, with the further steps of:

receiving an Access Request from a point of interaction, wherein the Access Request originates with the provisioning application stored in the digital device;

authenticating the Access Request; and providing a Payload to the provisioning application.

Method 21. The method set forth in Method 20, wherein the Payload includes one of the plurality of Identity Elements associated with the Intended User.

Method 22. The method set forth in Method 21, wherein the Payload does not include a data element which can personally identify the Intended User.

Method 23. The method set forth in Method 20, wherein the Payload includes a pre-authenticated data element associated with the Intended User.

Method 24. The method set forth in Method 20 wherein the Payload comprises a response to a Boolean query.

Method 25. The method set forth in Method 20, wherein the Access Request is validated by use of the GUID and the output of the algorithm in response to the Access Request.

Method 26. The method set forth in Method 20, wherein authenticating the Access Request requires a communication between the access point and the Identity & Authorization Management Platform.

Method 27. The method set forth in Method 26, wherein the communication is an unattended communication from the access point.

Method 28. The method set forth in Method 26, wherein an entity Element is transferred from the Identity & Authorization Management Platform to the access point in the communication for use in authenticating the Access Request at the access point by an attendant at the access point.

Method 29. The method set forth in Method 28, wherein the attendant is comprised of an electronic biometric device.

Method 30. The method set forth in Method 26, wherein the communication provides the Payload to the provisioning application.

Method 31. The method set forth in Method 30, wherein the Payload includes sensitive information which is encrypted.

Method 32. The method set forth in Method 30, wherein the Payload includes sensitive information which is encrypted.

Method 33. The method set forth in Method 20, wherein authenticating the Access Request requires accessing a cache of information stored in an offline Data Authentication reader.

Method 34. The method set forth in Method 1, with addition of the following steps:
receiving a second Device Identification from a second digital device intended for use by the Intended User;
authorizing digital access to said at least one Payload through use of the algorithm, the GUID and the second Device Identification; and
provisioning the second digital device with a second access control application configured to authorize the preselected digital access use by the Intended User to access said at least one Payload.

The next set of methods are all performed at the Point of Interaction which is a combination of electronic hardware, a software stack, and the ability to control a physical switch. The physical switch can be a lock (e.g., a door lock, or lock to a box) or some other type of physical device which grants or denies access to a physical asset.

Method 35. A method for authentication and authorization of an Intended User of a resource controlled by a point of interaction ("POI") comprised of electronic hardware, a POI program stored in a POI digital medium and means to control a physical switch, comprising the steps of:
initiating an interaction between the POI and a digital device provisioned with a program stored in a first digital medium configured for use with the POI;
sending, from the POI to the digital device, a response which includes a known application identifier and a request for a credential needed to access the resource;
receiving, at the POI from the digital device, an access transaction request comprised of a transaction cryptogram from which the credential can be authenticated;
at the POI, either initiating a service request for processing over a network connection or initiating an offline authentication to determine whether or not the physical switch should be activated to allow the Intended User access to the resource, wherein
  if a service request for processing is initiated over the network connection, the service request is sent over the network connection to a network Identity & Authorization Management Platform, operated by at least one hardware processor, to validate that the Intender User is authorized to access the Resource by the digital device; and
  receiving, at the point of interaction from the network Identity & Authorization Management Platform, an authorization response; or
  if an offline data authentication is initiated, and the POI has an offline capability via an offline Identity & Authorization Management Platform, validating whether the Intender User is authorized to access the Resource by the digital device.

Method 36. The method set forth in Method 35, wherein the interaction is initiated by the steps of:
tapping the digital device to the POI;
sensing, at the POI, the digital device; and
emitting, at the POI, a near field communication ("NFC") in a NFC data exchange format which includes a Uniform Resource Identifier.

Claim 37. The method set forth in Method 35, wherein the interaction is initiated by the steps of:
waiting, at the POI, for a near field communication ("NFC") field trigger indicating a nearby reader;
receiving the NFC field trigger from the digital device;
at the POI, emulating an ISO 14443 tag with a configured payload identifiable by a standard reader.

Method 38. The method set forth in any of Methods 35-38, wherein the POI operates only online, only offline, operates offline when online is unavailable, or when it chooses to operate offline during preselected time periods.

It will be appreciated by persons skilled in the art that the aforementioned methods do not set forth every aspect of the present invention, nor do they recite steps performed by a User; instead, they are meant solely to be illustrative and helpful in illustrating some of the methods disclosed herein.

Although the foregoing detailed description is illustrative of preferred embodiments of the present invention, it is to be understood that additional embodiments thereof will be obvious to those skilled in the art. For example, because of the level of trust that can be verified in accordance the foregoing methods, in which the Intended User can be trusted to be the Genuine User, the Digital Device is trusted to be the specific device it purports to be, and the Payload which is conveyed is trusted to not be altered, a POI (an even an unattended POI) can grant access to assets which require one or more specific Identity Elements to be met. In this regard, and merely for purposes of illustration, a POI could be configured to allow delivery of alcohol or prescription drugs, for example, in a vending machine or lockbox type of device, because qualifying Identity Elements can be used and trusted. Further modifications are also possible in alternative embodiments without departing from the inventive concept.

Accordingly, it will be readily apparent to those skilled in the art that still further changes and modifications in the actual concepts described herein can readily be made without departing from the spirit and scope of the disclosed invention.

What is claimed is:

1. A process for authentication and authorization of an Intended User of a digital device, implemented through use of an Identity & Authorization Management Platform operated by at least one hardware processor, comprising the steps of:
establishing a Genuine User ID ("GUID") for the Intended User based upon input received from an Identity Management Source, wherein the GUID is generated from a plurality of Identity Elements associated with the Intended User according to a GUID set of rules which establishes how many of the plurality of Identity Elements of the Intended User will be associated with the GUID for a preselected digital access use by the Intended User;
receiving a Device Identification from the digital device and linking the digital device to the GUID;
configuring an algorithm for the GUID for use in a Provisioning Application in the digital device and provisioning the digital device with the Provisioning Application;
establishing at least one Payload from at least one genuine Digital Data Record for the preselected digital access use by the Intended User, wherein the at least one genuine Digital Data Record is accessible by the Intended User;
validating that the Intender User is authorized to access the at least one Payload through use of the digital device, wherein validation is achieved through use of the algorithm for the GUID, the Device Identification and an output of the algorithm for the GUID; and provisioning the digital device with an access control application configured to authorize the preselected digital access use by the Intended User to access said at least one Payload.

2. The process of claim 1, comprising the further step of: creating a user profile for the Intended User, wherein the user profile is comprised of:
a plurality of authentication variables configured for use to authenticate a user account or the user profile;
a plurality of fixed variables which do not change over time;
a plurality of dynamic variables which change over time;
a plurality of mapping variables; and
a Transaction Counter.

3. The process of claim 2, comprising the further step of: creating a unique algorithm to protect sensitive data based upon input associated with both the user profile and the digital device.

4. The process of claim 3, wherein said sensitive data is comprised of at least one Identity Element.

5. The process of claim 3, wherein said sensitive data is comprised of said at least one Payload.

6. The process of claim 5, comprising the further step of: securely provisioning the digital device with output of the algorithm for the GUID when provisioning the digital device with the access control application.

7. The process of claim 6, wherein the access control application is configured to allow an Access Request originating within the digital device to provide the Payload to an access point without needing authorization from the Identity & Authorization Management Platform.

8. The process of claim 7, wherein the Payload includes a pre-authenticated data element associated with the Intended User.

9. The process of claim 6, comprising the further steps of:
receiving an Access Request from a point of interaction, wherein the Access Request originates with the Provisioning Application stored in the digital device;
authenticating the Access Request; and
providing the Payload to the Provisioning Application.

10. The process of claim 9, wherein the Access Request is validated by use of the GUID and the output of the algorithm for the GUID in response to the Access Request.

11. The process of claim 9, wherein authenticating the Access Request requires a communication between an access point and the Identity & Authorization Management Platform.

12. The process of claim 11, wherein the communication is an unattended communication from the access point.

13. The process of claim 11, wherein an Identity Element from the plurality of Identity Elements associated with the Intended User is transferred from the Identity & Authorization Management Platform to the access point in the communication for use in authenticating the Access Request at the access point by an attendant at the access point.

14. The process of claim 13, wherein the attendant is comprised of an electronic biometric device.

15. The process of claim 9, wherein authenticating the Access Request requires accessing a cache of information stored in an offline Data Authentication reader.

16. A process for authentication of an Intended User of a digital device and digital authorization of access to a Payload, implemented through use of an Identity & Authorization Management Platform operated by at least one hardware processor, comprising the steps of:

establishing a Genuine User ID ("GUID") for the Intended User based upon input received from an Identity Management Source, wherein the GUID is generated from a plurality of Identity Elements associated with the Intended User according to a GUID set of rules which establishes how many of the plurality of Identity Elements of the Intended User will be associated with the GUID for a preselected digital access use by the Intended User;
creating a user profile for the Intended User, wherein the user profile is comprised of:
a plurality of authentication variables configured for use to authenticate a user account or the user profile;
a plurality of fixed variables which do not change over time;
a plurality of dynamic variables which change over time;
a plurality of mapping variables; and
a Transaction Counter;
receiving a Device Identification from the digital device and linking the digital device to the GUID;
configuring a unique algorithm for the GUID for use in a Provisioning Application in the digital device and provisioning the digital device with the Provisioning Application, wherein the unique algorithm is configured through use of the user profile;
establishing at least one Payload through use of at least one genuine Digital Data Record for the preselected digital access use by the Intended User, wherein the at least one genuine Digital Data Record is accessible by the Intended User, and wherein access to said at least one Payload is limited by a set of rules and permissions; and
validating that the Intender User is authorized to access the at least one Payload through use of the digital device and access to said at least one Payload is permitted by the set of rules and permissions, wherein validation is achieved through use of the algorithm for the GUID, the Device Identification and an output of the algorithm for the GUID.

17. The process of claim 16, further comprising the step of receiving an access request cryptogram from the digital device which was generated by the Provisioning Application of the digital device through use of the algorithm.

18. The process of claim 17, wherein the access request cryptogram is used to validate that the Intended User is authorized to access the at least one Payload through use of the digital device.

19. A process for granting access to a Digital Data Record to a User implemented through use of an Identity & Authorization Management Platform operated by at least one hardware processor, comprising the steps of:
establishing a Genuine User ID ("GUID") for an Intended User based upon input received from an Identity Management Source, wherein the GUID is generated from a plurality of Identity Elements associated with the Intended User according to a GUID set of rules which establishes how many of the plurality of Identity Elements of the Intended User will be associated with the GUID for a preselected digital access use by the Intended User;
creating a user profile for the Intended User, wherein the user profile is comprised of:
a plurality of authentication variables configured for use to authenticate a user account or the user profile;
a plurality of fixed variables which do not change over time;

a plurality of dynamic variables which change over time;
a plurality of mapping variables; and
a Transaction Counter;
receiving a Device Identification from the digital device and linking the digital device to the GUID;
configuring a unique algorithm for the GUID for use in a Provisioning Application in the digital device and provisioning the digital device with the Provisioning Application, wherein the unique algorithm is configured through use of the user profile;
establishing at least one Payload through use of at least one genuine Digital Data Record for the preselected digital access use by the Intended User, wherein the at least one genuine Digital Data Record is accessible by the Intended User, and wherein access to said at least one Payload is limited by a set of rules and permissions; and
granting access to the at least one Payload upon validation that (1) the Intender User has authorized access to the at least one Payload through use of the digital device and (2) access to said at least one Payload is permitted by the set of rules and permissions, wherein validation is achieved through use of an access request cryptogram received from the digital device which was generated by the Provisioning Application of the digital device through use of the algorithm.

20. The process of claim 19, wherein the at least one Payload includes at least one of the plurality of Identity Elements associated with the Intended User.

\* \* \* \* \*